United States Patent [19]

Fischer, Jr. et al.

[11] Patent Number: 4,953,098
[45] Date of Patent: Aug. 28, 1990

[54] HIGHER HARMONIC CONTROL SYSTEM FOR X-WING AIRCRAFT

[75] Inventors: William C. Fischer, Jr., Monroe; Kenneth C. Arifian, Brookfield, both of Conn.

[73] Assignee: United Technologies Corporation, Hartford, Conn.

[21] Appl. No.: 257,473

[22] Filed: Oct. 13, 1988

[51] Int. Cl.$^5$ .............................................. F16F 15/10
[52] U.S. Cl. ...................................... 364/508; 73/579; 244/17.11
[58] Field of Search ...................... 364/508; 244/17.11; 318/564, 565; 73/570, 579; 416/20 R, 90 A

[56] References Cited

U.S. PATENT DOCUMENTS

| | | | |
|---|---|---|---|
| 3,102,597 | 9/1963 | Drees | 416/1 |
| 3,938,762 | 2/1976 | Murphy | 244/17.13 |
| 4,493,612 | 1/1985 | D'Anna | 416/20 R |
| 4,507,050 | 3/1985 | Jeffery et al. | 416/90 A |
| 4,514,143 | 4/1985 | Campbell | 416/23 |
| 4,534,702 | 8/1985 | Johnson, Jr. et al. | 416/20 R |
| 4,573,871 | 3/1986 | Krauss et al. | 416/20 R |
| 4,583,704 | 4/1986 | Krauss et al. | 244/17.11 |
| 4,594,537 | 6/1986 | Arifian et al. | 318/564 |
| 4,596,512 | 6/1986 | Krauss et al. | 416/42 |
| 4,626,171 | 12/1986 | Carter, Sr. et al. | 416/90 A |
| 4,678,401 | 7/1987 | Bradford et al. | 416/32 |
| 4,819,182 | 4/1989 | King et al. | 364/508 |

Primary Examiner—Thomas G. Black

[57] ABSTRACT

In an X-Wing aircraft a dynamic higher harmonic control (HHC) system addresses the vibration which typifies a very rigid rotor and is implemented in two ways—a scheduled HHC and an active HHC. A scheduled HHC is located within the quadruple redundant portion of the flight control computers (FCC). This includes look-up maps for the second through fifth harmonic coefficients of the control equation as a function of airspeed and lift for rotary wing (RW) operation, and as a function of rotor speed for conversion (CV) operation. These are added to the collective and cyclic terms of the control equation and implemented through the pneumatic control valve (PCV) actuators. This flight critical portion of the HHC maintains vibration loads within structural limits. An active HHC, implemented in a dual redundant configuration, is added primarily to enhance vibration control during maneuver conditions and during conversions. It monitors vibrations at selected locations and in selected axes of the vehicle and generates corrective factors, which are added to the scheduled coefficients. The active HHC, representing a significant computational burden, is implemented in a separate dual processor computer section, complete with its own input/output signal processing.

6 Claims, 9 Drawing Sheets

HIGHER HARMONIC CONTROL SYSTEM FOR X-WING AIRCRAFT

DESCRIPTION

The invention described herein was made in the performance of work under NASA Contract No. NAS2-11771 and is subject to the provisions of Section 305 of the National Aeronautics and Space Act of 1958 (72 Stat. 435; 42 U.S. C. 2457).

CROSS REFERENCE TO RELATED APPLICATIONS

This application relates to some of the same subject matter as the following two applications, both of which were filed concurrently with this application and the disclosures of which are incorporated herein by reference.

Ser. No. 07/257474 entitled "X-Wing Fly-By-Wire Vehicle Management System" by William C. Fischer; and Ser. No. 07/256,937 entitled "Flight Control Law System for X-Wing Aircraft" by Thomas H. Lawrence and Phillip J. Gold.

TECHNICAL FIELD

This invention relates to "X-Wing" aircraft and more particularly to a system for adaptively controlling higher harmonic vibrations generated in the aircraft's rotor system.

BACKGROUND ART

Introduction: X-Wing Aircraft

An X-Wing aircraft is a rotary wing aircraft that uses a rigid rotor/wing utilizing circulation control airfoils. The rotor is driven mechanically, and the rotor blades operate essentially in fixed pitch. The rotor may rotate, as in a helicopter, or it may be stopped and positioned so as to act like a fixed wing.

Collective and cyclic control is achieved by control of air circulation about a Coanda surface on the blade airfoils. This is done by blowing compressed air through leading edge and trailing edge ducts in the rotor blades and modulating the amount of air being ejected through span-wise slots on the leading and trailing edges of the rotor blades.

The rotor system for an X-Wing aircraft includes a hub and attached rotor blades and a pneumatic system for delivering pressurized air separately to the leading edge and the trailing edge of the individual rotor blades at a desired pressure and mass flow. The pneumatic system includes a compressor, a stationary air supply chamber, valving for controlling the flow of air from the chamber to the blades, and a rotating air distribution arrangement for conducting air separately to the leading edge and trailing edge of the blades.

In circulation control airfoils, pressurized air is ejected from span-wise openings or slots along the upper side of the rounded airfoil leading/trailing edge Coanda surface. The airflow from the slots attaches to the rounded leading/trailing edge, which increases the circulation, to provide a corresponding lift increase compared to an airfoil having no ejected air. For a given blade internal pressure and aerodynamic condition, the lift change due to circulation control is proportional to the area of the slot opening up to a certain limit. When the slot opening exceeds this limit, no additional lift is achieved, a condition analogous to a stall in a conventional airfoil.

Since an X-Wing circulation control airfoil is symmetrical about its half chord, the leading edge on the advancing side of the blade path disk becomes the trailing edge on the retreating side, and vice-versa. To maximize performance as the rotor slows down, it is desirable that the "local" leading edge slot be closed at all azimuth positions.

Conventional helicopters provide aircraft pitch and roll control by varying blade pitch from medium-to-high, or medium-to-low to medium at a once "per rev" (rotor revolution) rate, as the blades whirl around the rotor disk. The X-Wing aircraft includes 1-per-rev pneumodynamic control and also has more rapid pneumodynamic control variance, up to a 5-per-rev rate, to reduce system vibrations.

The X-Wing aircraft is designed to hover like a helicopter and cruise at an airplane's high speeds. It uses a stoppable rotor/wing, which, as noted, rotates like a helicopter rotor in low speed flight and stops to become a fixed wing for high speed cruise. It offers an excellent compromise for vertical take-off or landing (VTOL) hover/cruise capabilities, horsepower/fuel efficiency and ultimate payload capacity.

It achieves rotor control via a pneumatic medium controlled by a full authority fly-by-wire (FBW) system with, for example, quadruple redundancy for all flight critical functions.

The flight control system for an X-Wing aircraft not only serves the usual or traditional flight control function of a typical fixed wing aircraft or, separately, of a helicopter, but instead in one system manages the equivalent of three vehicles, since the X-Wing operates in a rotary wing mode (RW), a fixed wing or stopped rotor mode (SR), and a conversion state (CV) between the two. In particular, an overall vehicle management system using fly-by-wire technology is used to control and manage the complexity of such an aircraft.

Some exemplary X-Wing related patents, all owned by the assignee hereof, are listed below:

| Patent No. | Patentee(s) | Issue Date | Title |
|---|---|---|---|
| 4,493,612 | D'Anna | 01/15/85 | "Axially Slideable Plenum for Circulation Control Aircraft" |
| 4,507,050 | Jeffery et al | 03/26/85 | "Pneumatic Valve Control for Circulation Control Aircraft" |
| 4,534,702 | Johnson et al | 08/13/85 | "Pneumatic Control Valve Actuator Computer Control Arrangement" |
| 4,573,871 | Krauss et al | 03/04/86 | "X-Wing Aircraft Circulation Control" |
| 4,583,704 | Krauss et al | 04/22/86 | "Pneumatic System Structure for Circulation Control Aircraft" |
| 4,594,537 | Arifian et al | 06/10/86 | "Redundant Control System for X-Wing Valve Actuators" |
| 4,596,512 | Krauss | 06/24/512 | "Circulation Controlled Rotor Blade Tip Vent Valve" |
| 4,626,171 | Carter et al | 12/02/86 | "Rotor Blade Construction for Circulation Control Aircraft" |
| 4,678,401 | Bradford et al | 07/07/87 | "Rotor Control System" |

A revolutionary concept such as "X-Wing" requires innovative approaches to service the technology leap involved in this type of hybrid aircraft. A system for adaptively controlling higher harmonic vibrations generated in the aircraft's rotor system is one area of such a vehicle which faces significant challenges.

Higher Harmonic Control

Some exemplary harmonic control related patents are listed below:

| Patent No. | Patentee(s) | Issue Date | Title |
|---|---|---|---|
| 3,102,597 | Dress | 09/03/63 | |
| "Method of Second Harmonic Control" | | | |

Adaptive higher harmonic control (HHC) for rotor aircraft has been attempted before. The prior art approach was a static adaptive control, in which it was assumed that the higher harmonic control or HHC inputs and vibration were related by a steady state system model. The HHC inputs were updated at the beginning of a rotor revolution, a short period of time was allowed for transients to die down (for example, approximately a half revolution) and vibration data was measured.

The change in the HHC input and the change in vibration was used to define an "n×m" matrix of constants relating the "n" vibration signals to the "m" HHC inputs. This so called T-Matrix was then used with a minimum variance control algorithm to select new HHC approximately once per revolution. This is the type of HHC used by Hughes Helicopters, Inc. on the OH-6A aircraft and by Sikorsky Aircraft on the S-76 aircraft.

However, because this prior art approach is based on the assumption of steady state HHC-vibration relationships, this type of controller is not regarded to be appropriate to the X-Wing conversion process.

In contrast, the control approach with which the present invention can be used is a "dynamic control". In this case the relationship between the HHC inputs and vibration is assumed to be that of a dynamic system and, instead of identifying a T-Matrix of constants, the controller identifies coefficients of an appropriate order model and, based on the system so identified, applies corrective control. Vibration and HHC data are processed continuously and updates to the HHC are made as frequently as possible, for example several times in each rotor revolution.

This type of controller is conceptually suited to X-Wing conversion.

DISCLOSURE OF INVENTION

The higher harmonic control (HHC) system of the present invention addresses the vibration which typifies a very rigid rotor. The HHC is implemented in two ways - a scheduled HHC and an active HHC.

A scheduled HHC preferably is located within the quadruple redundant portion of the flight control computers (FCCs). This includes look-up maps for the second through fifth harmonic coefficients of the control equation as a function of airspeed and lift for rotary wing (RW) operation, and as a function of rotor speed for conversion (CV) operation. These are added to the collective and cyclic terms of the control equation and implemented through the pneumatic control valve (PCV) actuators. This flight critical portion of the HHC maintains vibration loads within structural limits.

An active HHC, implemented in a dual redundant configuration, is added primarily to enhance vibration control during maneuver conditions and during conversions. It monitors vibrations at selected locations and in selected axes of the vehicle and generates corrective factors, which are added to the scheduled coefficients. The active HHC represents a significant computational burden and therefore preferably is implemented in a separate dual processor computer section, complete with its own input/output signal processing.

Exemplary Operating Objectives

The following are exemplary operating objectives for the full up HHC system of the present invention for a particular exemplary aircraft:

1. Exemplary structural objectives include
   (a) vibratory hub moments less than, for example, twelve and half thousand foot-pounds (12,500 ft-lb) in steady state conditions;
   (b) vibratory hub moments no worse than, for example, thirty-three thousand, four hundred foot-pounds (33,400 ft-lb) in conversion, for a duration not to exceed twenty-five (25) seconds per conversion; and
   (c) vibratory hub moments in helicopter maneuvers not to exceed, for example, twenty-five thousand foot-pounds (25,000 ft-lb).

2. Exemplary vibration objectives include
   (a) cockpit vibrations less than, for example, four-tenths (0.4) g (where "g" is the equivalent force of gravity) at 4P (where "P" is rotor passage or rotor speed in revolutions per second) and four-tenths (0.4) g at 8P in steady level flight;
   (b) Cockpit vibration in conversion no worse than, for example, three-quarters (0.75) g at 4P and one-half (0.5) g at 8P each for a duration of five (5) seconds or less;
   (c) cockpit vibration in mild maneuvers of less than, for example, six-tenths (0.6) g at 4P;
   (d) a transient change in vibration of, for example, four-tenths (0.4) g for a modest gust (e.g. 10 ft/sec sharp edged) or stick input (e.g. 10%); and
   (e) vibration throughout the aircraft less than the equipment specifications set for the aircraft.

The following objectives apply to the pre-scheduled HHC (closed loop system failed):

1. Exemplary structural objectives include
   (a) vibratory hub loads in level flight (return to field and landing) of, for example, twenty-five thousand foot-pounds (25,000 ft-lb) or less; and
   (b) hub moments in conversion not to exceed, for example, one hundred thousand foot-pounds (100,000 ft-lb) peak (limit load is 140,000 ft-lb); it is assumed that conversion will not be initiated without the full HHC system being operational.

2. Exemplary vibration objectives include
   (a) steady state level flight cockpit vibration not to exceed, for example, six-tenths (0.6) g at 4P or six-tenths (0.6) g at 8P;
   (b) cockpit vibration in conversion no worse than, for example, one and a half (1.5) g at 4P and a half (0.5) g at 8P each for a duration of for example fifteen (15) seconds; and
   (c) equipment vibration no worse than, for example, twice that in the cockpit.

The foregoing and other objectives, features and advantages of the present invention will become more apparent from the following further description and drawings.

BEST MODE FOR CARRYING OUT THE INVENTION

Higher Harmonic Control (HHC) Terminology

Figure 1:
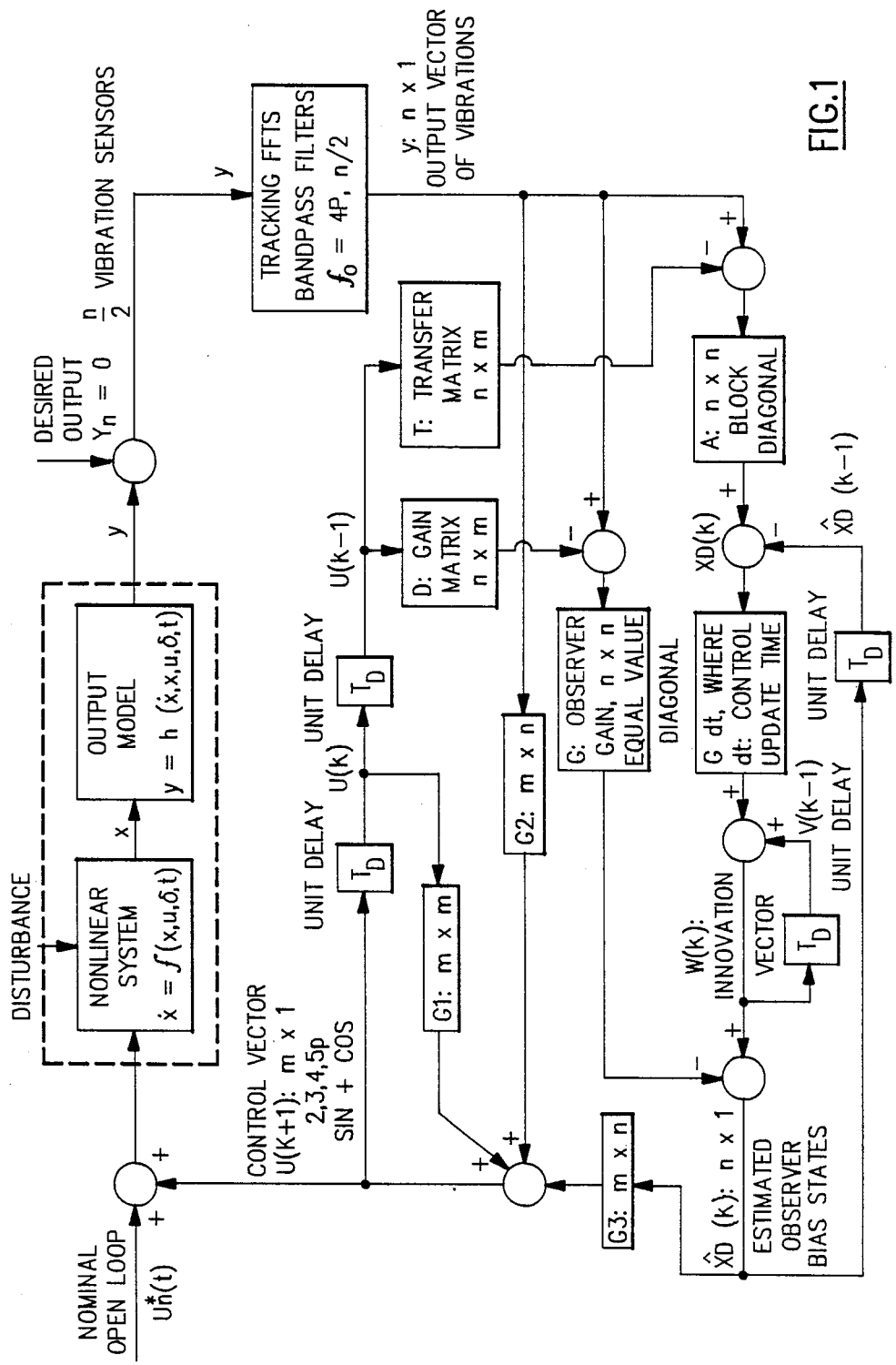
FIG. 1 is a schematic diagram of a dynamic controller with bias rejection which can be used in the higher harmonic control (HHC) system of the present invention.

The following terminology is used in the discussion of the present invention.

"HHC" — The application of rotor control inputs at $k \times P$ (where "k" is a constant equal to or greater than two typically to a maximum of five, i.e. $5 \geq k \geq 2$, and "P" is rotor passage or rotor speed in revolutions per second) for the control of vibration and/or vibratory loads at $b \times P$ (where "b" is the number of blades, i.e. four for the X-Wing).

"HHC Coefficients" $\times$ For the X-Wing, the coefficients $A_{kc}$ and $A_{ks}$ in the following expression for blade root pressure:

$$P_{HHC}(\psi) = - \sum_{k=2}^{5} (A_{kc} \cos k\psi + A_{ks} \sin k\psi)$$

where "$\psi$" equals the azimuth, "k" is the constant as above, "c" stands for "cos" (cosine) and "s" for "sin" (sine). "$\psi$" is referenced to the downstream position and is positive in the direction of rotation.

"Open Loop HHC" — An HHC system in which control inputs are made without feeding back a measure of the resultant vibration.

"Pre-scheduled HHC" — A special case of open loop HHC, in which the HHC is defined by a set of coefficients, each of which is a predetermined function of such flight parameters as airspeed, thrust and rotor speed.

"Closed Loop HHC" — Any HHC system in which vibrations and/or vibratory loads are measured and utilized during a flight to determine HHC inputs to the control system.

Closed loop and active HHC are synonymous.

The closed loop HHC can take any one of several forms including the following three:

(a) "Fixed Gain Feedback HHC System" — A closed loop system, in which $b \times P$ vibration signals are fed back through predefined fixed gain control laws, and the HHC control inputs are updated.

(b) "Scheduled Gain Feedback HHC System" — A closed loop system, in which one or more gains or constants included in the control laws are scheduled functions of such aircraft states as airspeed, rotor speed, etc.

(c) "Adaptive HHC System" — A closed loop system in which the relationship between HHC inputs and the resultant vibration is identified on line, and this information plus the measured vibration is used in a computation which attempts to select minimum — vibration HHC inputs.

Closed Loop HHC Vibration Controller

The controller for the closed loop HHC system should satisfy at least the following six considerations.

1. Ability to deal with the steady-state vibration resulting from errors in open loop HHC tables or changes in steady state vibration, resulting from the fact that open loop blowing is not scheduled versus such things as shaft angle, hub pitch moment, pitch rate, etc. Included here is the concern for the closed loop system's ability to handle these tasks, with the limited authority that it can have because it is only dual redundant.

2. Ability to deal with the combination of "steady state" and transient vibration in conversion.

3. Ability to deal with transient vibration resulting from turbulence and pilot control inputs, especially in light of significant time lags in the computer, actuator and pneumodynamic systems.

4. The mutual effects of the closed loop HHC and pilot/flight control system on system stability and controllability, and the selection of the most suitable band widths for the two systems.

5. The degree to which the gains making up the closed loop control laws must be scheduled with flight state in order for the system to work and, if possible, be robust.

6. The difficulty associated with developing or refining the various control laws based on wind tunnel and flight test data.

The preferred controller for satisfying the foregoing six considerations is a dynamic controller with bias rejection as discussed below.

Dynamic Controller with Bias Rejection

A dynamic controller with bias rejection, as used in conjunction with the present invention but the details of which are not part of the present invention, is illustrated in FIG. 1, and is designed to handle both steady state and transient vibration. It typically updates the controls on the order of ten times per rotor revolution. The exemplary, relatively specific control law is as follows:

$$U_{K+1} = G_1 U_K + G_2 Y_K + G_3 \hat{X}_D$$

where "U" is the total feed-back function, "$G_1$—$G_3$" are various gain matrices, "K" is a series of increasing, reiterated integers and "$Y_K$" and "$\hat{X}_D$" are specified aerodynamic control law functions. A more generic control law would be:

$$U_{K+1} = G_1 U_K + G_n Y_n \ldots$$

where "n" is an increasing series of integers.

The more specific control law is similar to a quasi-static controller, except that it adds a matrix $G_3$ multiplied by a state vector, which is representative of a slowly varying component in 4P cosine and 4P sine vibration signals, such as results from an error in an open loop HHC table entry or a slow input by the pilot. This slowly varying vibration component is distinguished from the transient variation in 4P cos and 4P sine responses by the use of a set of observer equations.

These equations are based on an identified math model of the dynamic system, which models what the dynamic (transient) response to controls should be and allows the lower frequency or bias component, "$\hat{X}_D$", to be estimated for use by the control law shown. The gains $G_1$, $G_2$ and $G_3$ and three additional matrices used in the observer equations are scheduled functions of flight condition.

The matrices appropriate for an X-Wing aircraft will vary from aircraft design to design. The process used to select particular matrices can be based on acquiring transient response data (analytic or measured time histories) to perform a system identification process to arrive at a plant model for a specific X-Wing aircraft and then apply optimal control techniques to establish specific gain matrices.

The dynamic controller with bias rejection currently represents the preferred embodiment. The quasi-static controller is a subset of the dynamic controlling equations (requiring a change in gains and update rate) and provides an alternate possibility.

Closed Loop HHC Implementation

System Configuration

Figure 2:
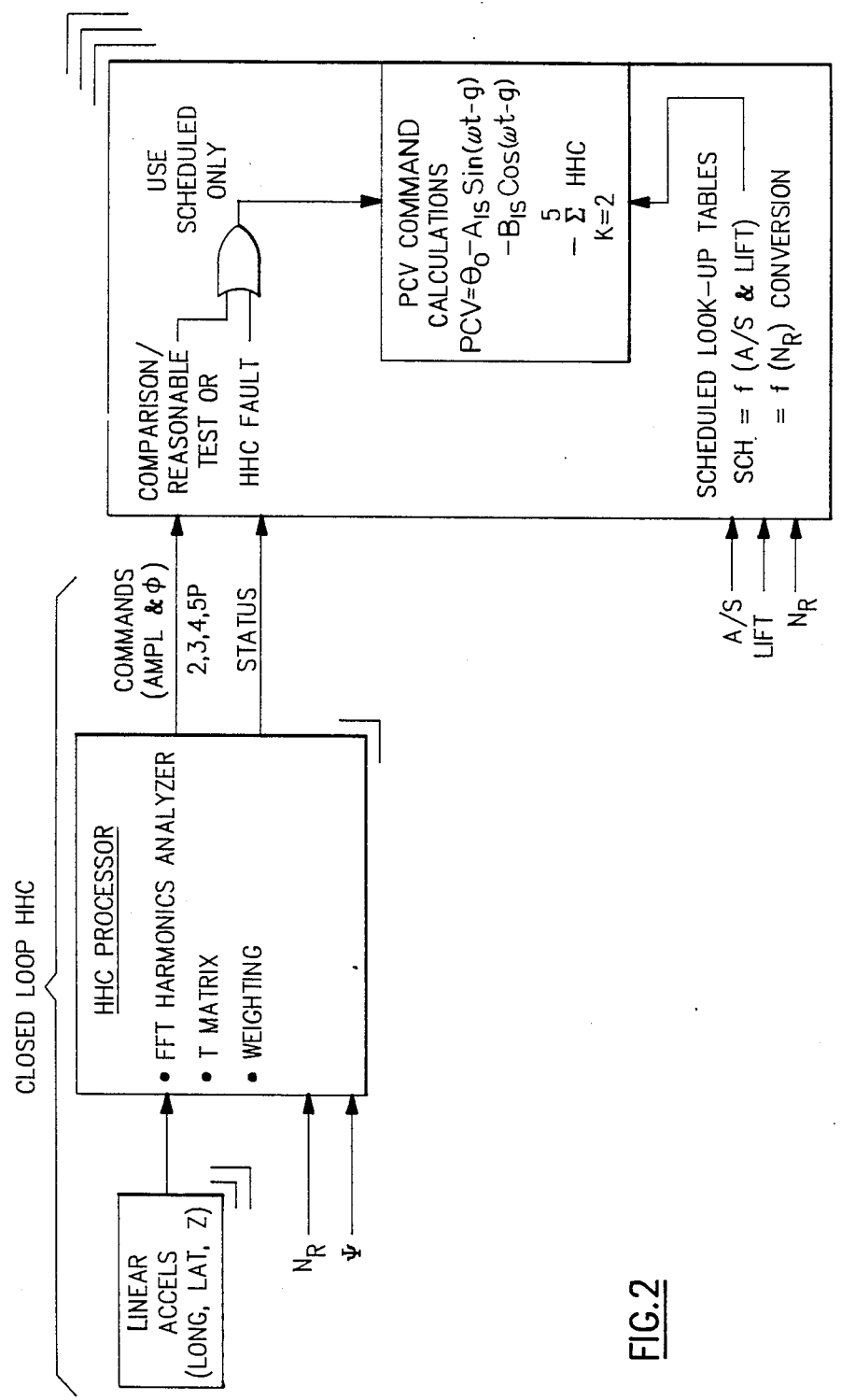
FIG. 2 is a block diagram illustrating a closed loop HHC part of the HHC system of the present invention.

From a redundancy standpoint the flight critical aspects of the HHC are addressed by the scheduled HHC resident in the quadruple manual flight control system (MFCS). The closed loop HHC has been categorized as flight necessary. As illustrated in FIG. 2, it is accordingly structured as a dual computational element providing fail-safe redundancy. To improve system reliability, the vibration sensors preferably are triplex, thereby providing a fail operational capability for these usually less reliable items.

The outputs of the two closed loop HHC computers preferably are cross channel data linked to all four MFCS. The MFCS, after a comparison test, adds the closed loop commands as a delta to the scheduled HHC values prior to input into the control equation calculations.

The closed loop HHC computers are contained upon three modules housed at the rear of the two flight control computers (FCC), which do not contain automatic flight control system (AFCS) computers.

Figure 2A:
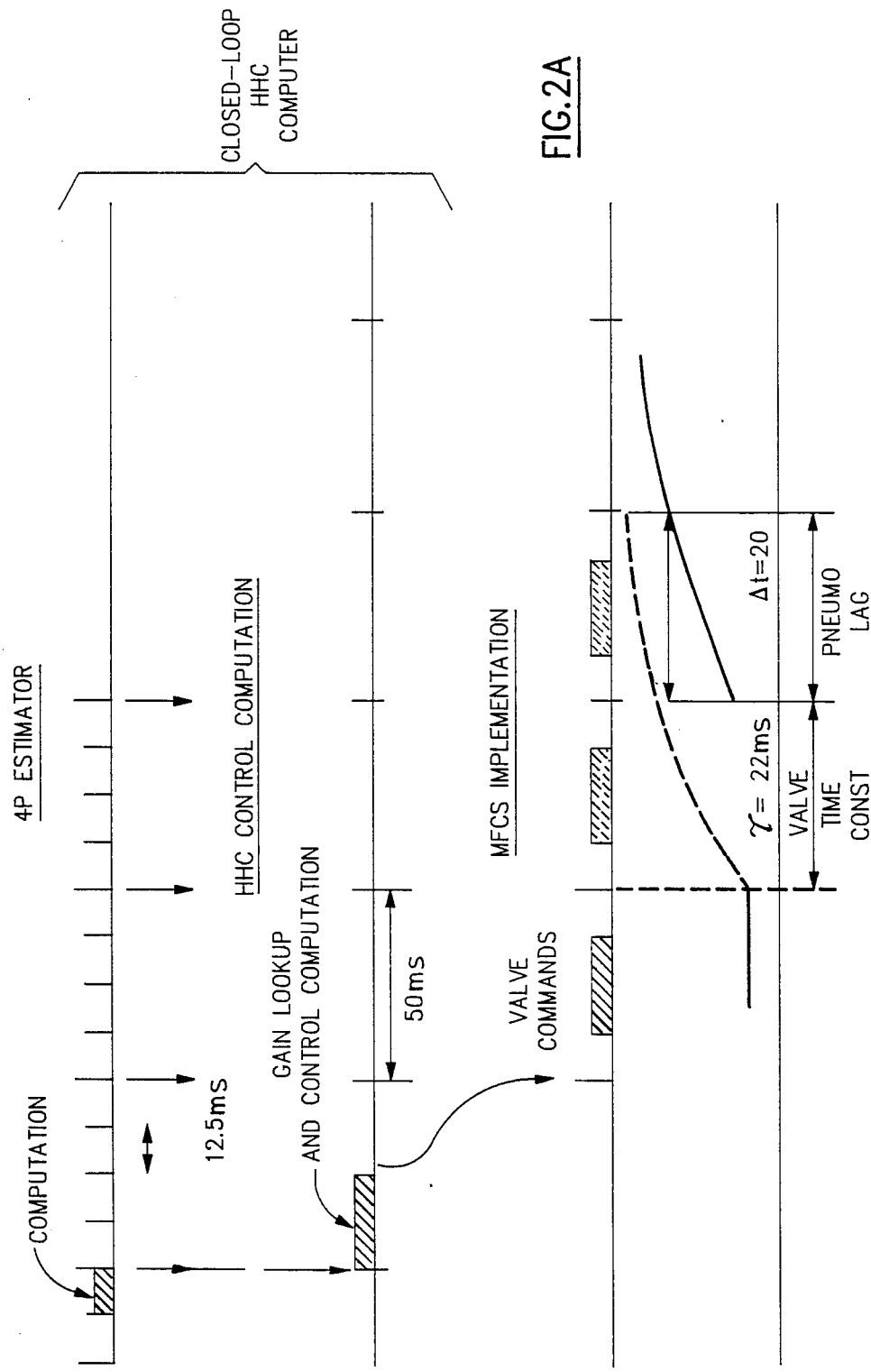
FIG. 2A is a graphical representation of HHC system timings.

The timing of control system responses to observed vibration is implicit in the FCC design; dictated largely by thruput limitations, but responsive to HHC system requirements at the time of system architectural design. As portrayed in FIG. 2A, it indicates that, although a fast Fourier transform (FFT) provides fresh data on the observed vibration every twelve and a half (12.5) msec, there can be a one hundred and fifty (150) msec (worst case) transport delay in that data being reflected in the PCV actuator command.

That command is then subject to actuator and pneumo system response lags prior to appearing as an aerodynamic force at the blade. Obviously a pipeline sequence of solution is occurring, but with later estimation of vibration not influenced by the immediately prior commands.

The baseline computer requirements include the following major elements, which are the basis of the exemplary hardware design:

Controller A algorithm

■ gain variation with NR (rotor RPM)
■ One 8×8 matrix
80 Hz computation of FFT
20 Hz control update rate (alternatively 10 Hz w/floating point)
4 input vibration signals
4P FFT characterization The software design is strongly dependent on the gain values, if the computer is a fixed point processor. A fixed point processor gives a fifty percent (50%) faster computational capability than a floating point one, which capability increases the throughput, a key system concern. It does, however, mandate a meticulous scaling effort to avoid overflow failure conditions for the computer.

However, based on all considerations, a floating point system is currently preferred.

Algorithm

Three key system parameters are monitored to judge system capability to absorb a given algorithm. These and the system features which primarily impact them are:

Thruput Number of matrices Interpolation FFT complexity Floating point
Memory Number of matrices Granularity Variables
Scaling Resolution vs range X 2 gain changes These interrelated factors are balanced in the preferred algorithm, both amongst themselves and against the dynamics requirements of the aircraft.

Preferred Over-All System Embodiment

Figure 3:
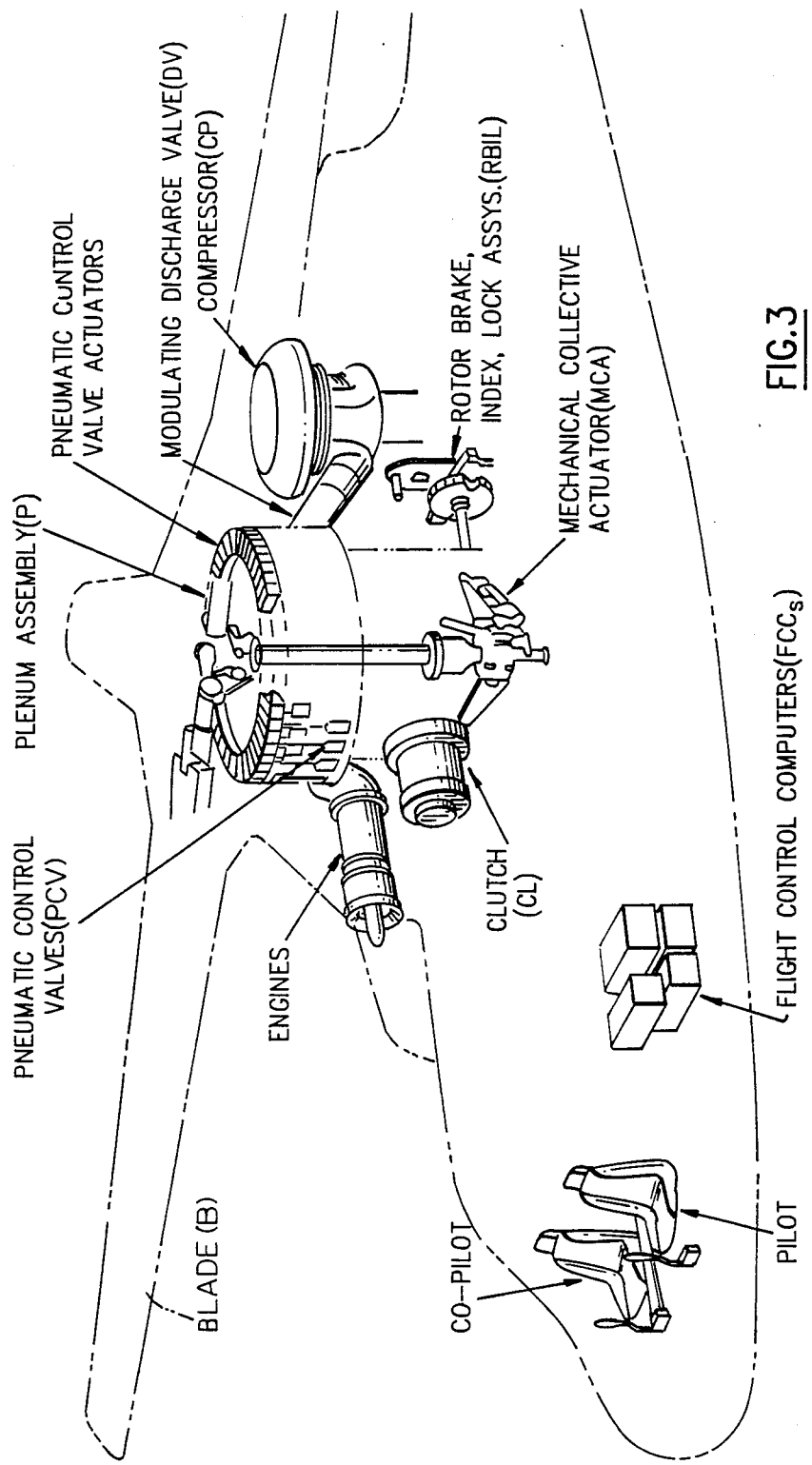
FIG. 3 is a perspective, side view of an exemplary prototype X-Wing aircraft, based generally in its configuration on NASA's Rotor Systems Research Aircraft, showing the general arrangement of the various mechanical components of the aircraft, which are involved in the overall vehicle management system, of which the HHC system of the present invention is a part, with the outline of the aircraft being shown in phantom line.

For general background information and reference, an X-Wing aircraft, showing the general arrangement of the various mechanical components of the aircraft, is generally illustrated in FIG. 3.

Figure 4:
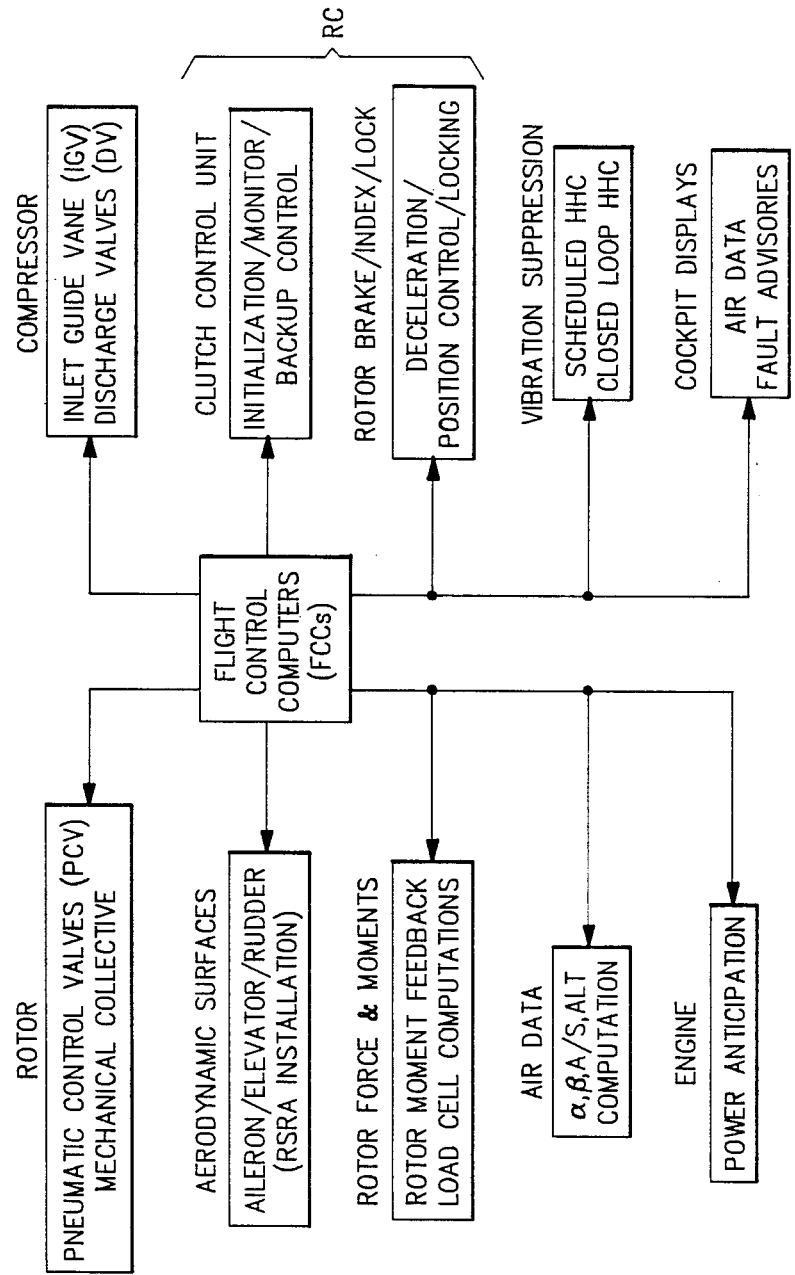
FIG. 4 is a simplified, block diagram illustrating the major vehicle management subsystems of the present invention, which includes the HHC system of the present invention.

As can be seen in FIG. 4, at the heart of a vehicle management system (VMS) for managing the over-all vehicle or X-Wing aircraft are the quadruple redundant flight control computers (FCCs). Major subsystems of the VMS include the pneumatic control of the rotor, which includes collective, longitudinal and lateral, and HHC blowing effected through control of the pneumatic control valves (PVC), all graphically illustrated in the upper left and lower right blocks under the block titles "rotor" and "vibration suppression," respectively. Rotor conversion (RC) is controlled by the clutch, brakes, indexer and locks (CBIL) illustrated in the right blocks of the simplified block diagram, labeled "clutch control unit" and "rotor brake/index/lock." It should be understood that the rotor conversion subsystem controls both the steady states (rotary and stopped) of the rotor and the conversion (CV) between those states, with the latter being achieved via the clutch CL (FIG. 3) or the rotor brake/indexing/locking RBIL assembly (FIG. 3) functions for the rotary and stopped conversions, respectively.

Figure 5:
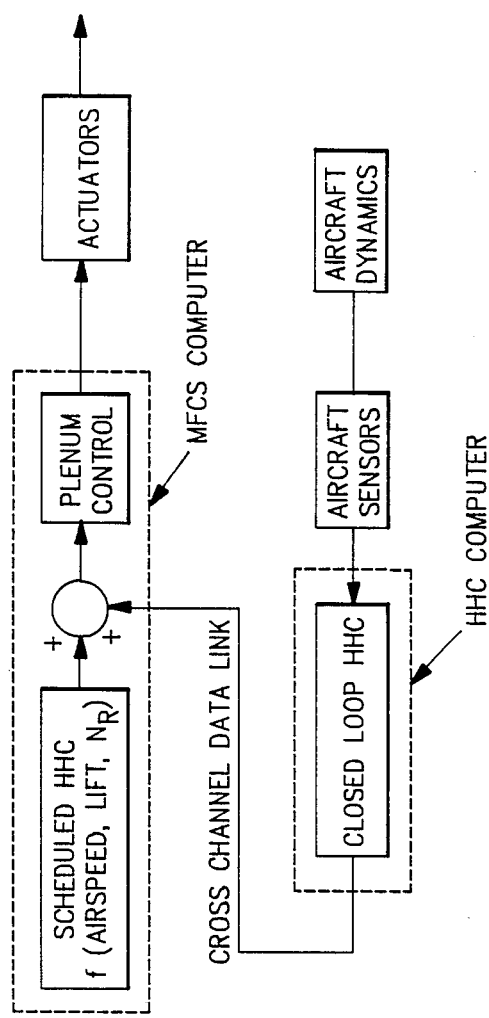
FIG. 5 is a simplified, logic block diagram illustrating the implementation of the HHC system of the present invention.

The higher harmonic control (HHC) system addresses the vibration which typifies a very rigid rotor. As generally illustrated in FIG. 5, the HHC is implemented in two ways. A scheduled HHC is located within the quadruple redundant portion of the flight control computers FCCs. This uses look-up maps for the second through fifth harmonic coefficients of the control equation as a function of airspeed, lift and rotor speed, and the rotor speed for conversion operation. These are added to the collective and cyclic terms in the control equation and implemented through the pneumatic control valve (PCV) actuators.

Figure 6:
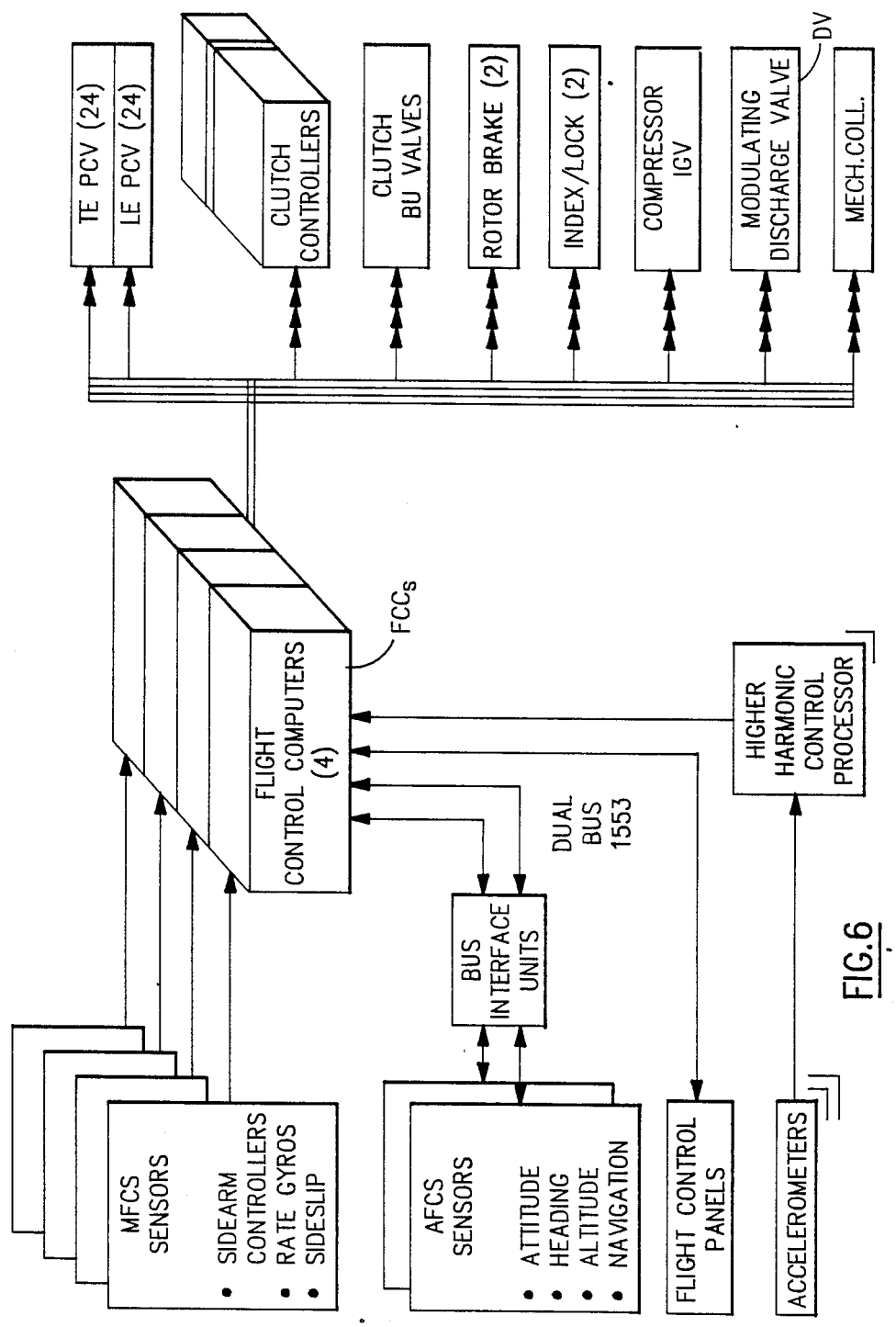
FIG. 6 is a simplified, block diagram generally illustrating the hardware redundancy approach, including quadruple redundancy for flight critical functions, used as part of the vehicle management system for the X-Wing aircraft and including the dual redundancy for the HHC processor used in the HHC system of the present invention.

This flight critical portion of the HHC maintains vibration loads within structural limits. An active HHC, implemented in a dual redundant configuration, is added primarily to enhance vibration control during maneuver conditions and during conversions. It monitors vibrations at selected locations and in selected axes of the vehicle and generates corrective factors which are added to the scheduled coefficients. The active HHC represents a significant computational burden and therefore, as generally illustrated in FIG. 6, is preferably implemented in a separate dual processor computer section, complete with its own input/output signal processing, but still integrated to be physically located within two of the flight control computers (FCCs).

Figure 7:
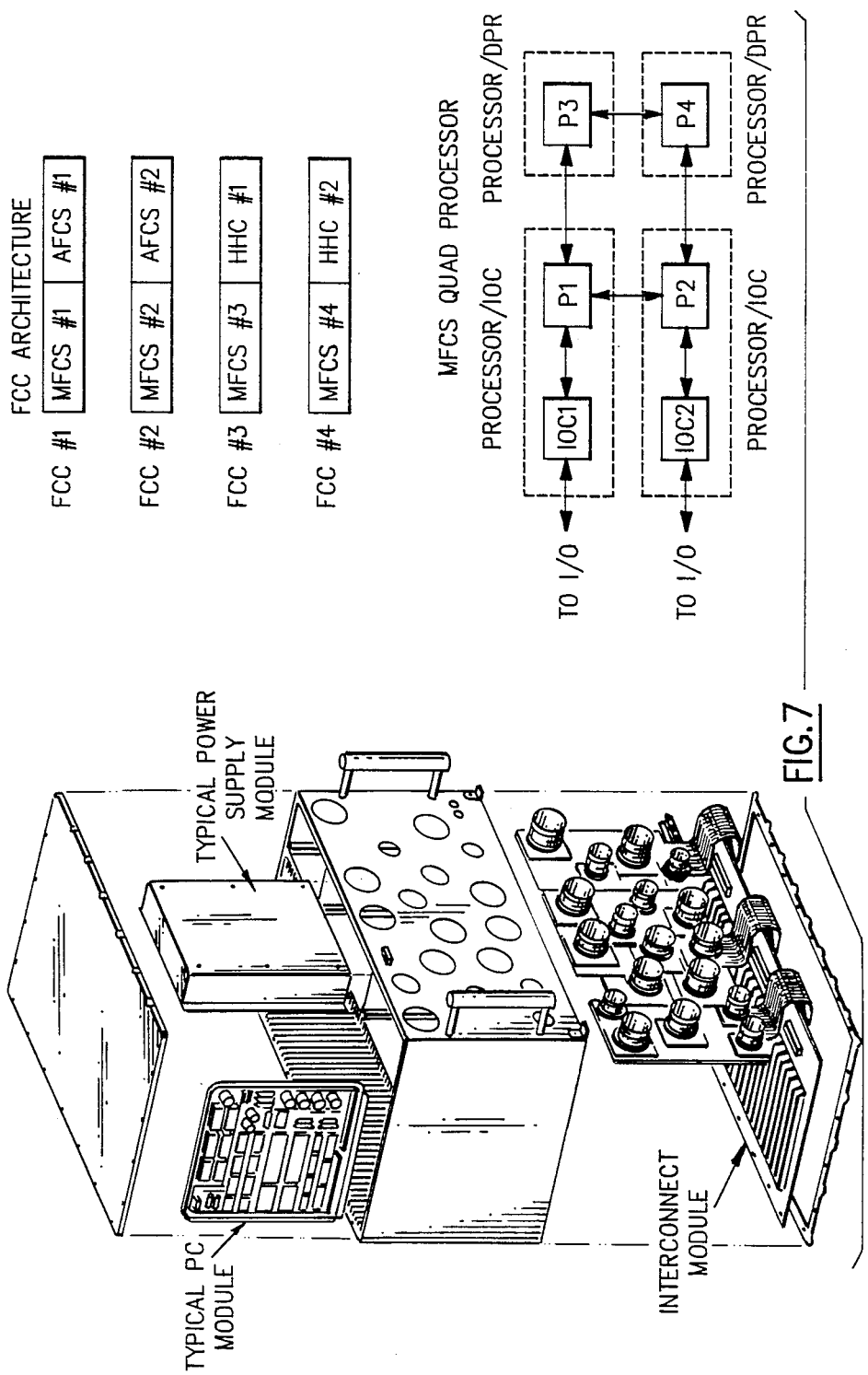
FIG. 7 includes a perspective, exploded view of the exemplary hardware and simplified, block diagrams of the architecture for the flight control computer used in the vehicle management system for the aircraft, including the HHC system of the present invention.

Vibration alleviation is provided by the HHC system, which is implemented in the two noted forms, as can be seen in FIG. 5. These two forms, as noted, include a scheduled system resident in the flight critical portion of the vehicle management system (VMS) in the manual flight control system (MFCS), and a closed loop active HHC resident in the HHC portion of two FCCs, as also shown in FIG. 7, and configured as a dual (fail safe) function, with a cross channel data link between them for communication with the MFCS (see FIG. 5). Thus, the scheduled HHC is in the MFCS, while active HHC is computed in the HHC section and the results sent to the MFCS for addition to the scheduled HHC commands.

Figure 8:
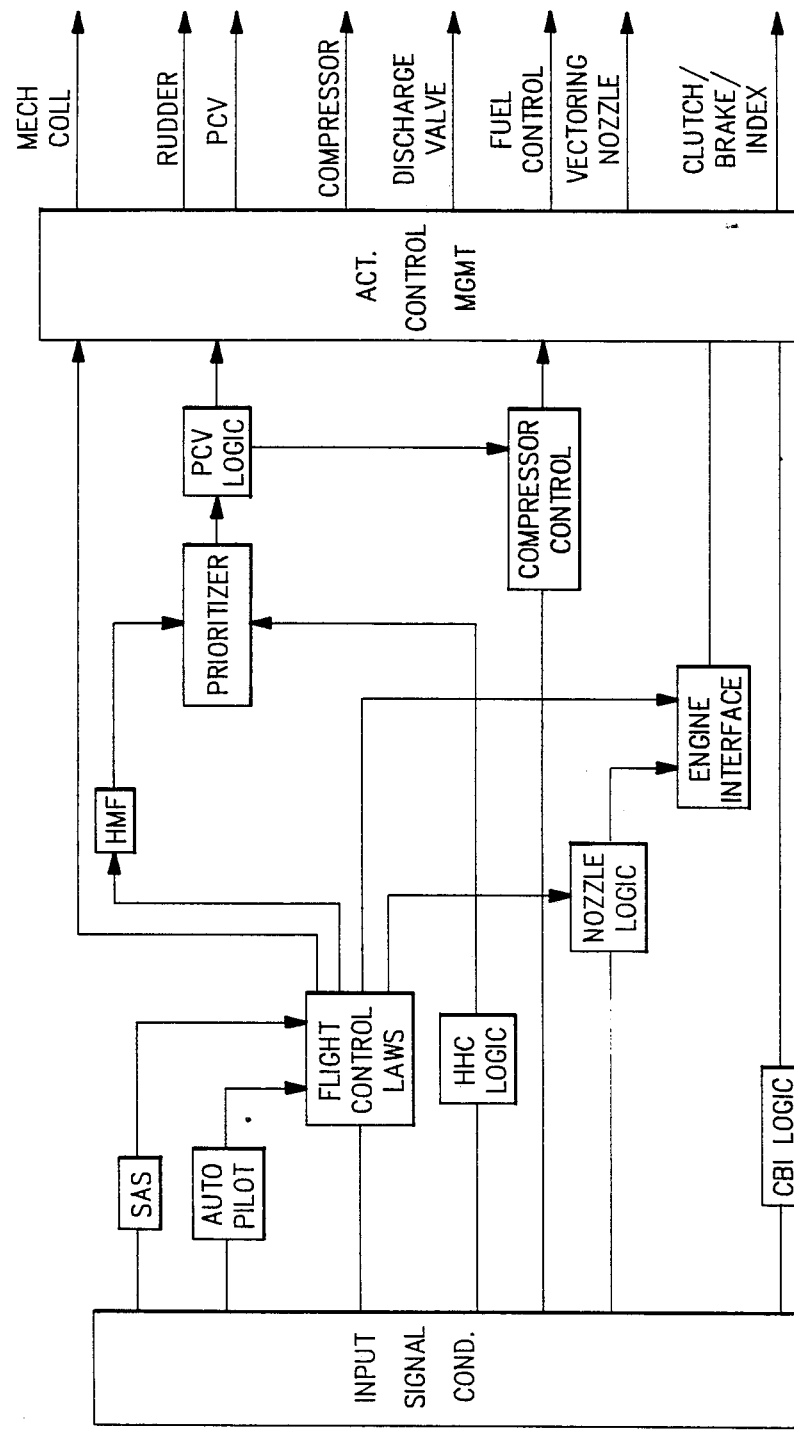
FIG. 8 is a block diagram for the various integrated components of the flight control computer of the vehicle management system for the aircraft, including the HHC system of the present invention.

The dependency of cyclic and HHC control ranges upon collective blowing preferably is treated by the use of collective pitch for dynamic inputs and a prioritizer (note FIG. 8) in the pneumatic control valve (PCV) algorithms. The mechanical collective functions to supplement pneumatic collective, in hovering flight, and acts to increase lateral control power, when in high speed rotary wing and stopped rotor flight.

As noted above, the valve control logic must also include provisions for HHC in rotary wing mode. HHC preferably includes the application of pressure variations that occur at two, three, four and five times per rotor revolution for the purpose of vibration reduction.

The general control law system aspects of the VMS system are described in greater detail in the co-pending application entitled "Control Law System for X-Wing Aircraft" referred to above.

Mission elements, such as, for example, the automatic flight control system (AFCS) for automated modes of flight path control and its associated "1553" interface to a modern avionic suite for navigation and flight path information, are dual in their redundancy. With the flight critical elements or factors, having, for example, quadruple redundancy, it can be seen that the mission elements or factors have a lesser level of redundancy. Two types of critical factors are separately considered and segregated, with greater back-up or redundancy being provided for the flight critical factors. As noted above, the active HHC is dual computational with triplex sensors provided to enhance system reliability by an extra level of redundancy in this lesser reliability element.

The complete computer set can be comprised of, for example, four boxes, all containing identical primary control and back-up control software (BUCS) functions (flight critical). As seen in the upper right of FIG. 7, in addition, two of the boxes preferably contain the automatic flight control system (AFCS); and the other two boxes preferably contain an active HHC.

Although the overall flight reliability touches on all vehicle elements, the control system design of the VMS focuses upon the three areas of prime power, hardware, and software redundancy.

The VMS aspects of the system are described in greater detail in the co-pending application entitled "X-Wing Fly-By-Wire Vehicle Management System" referred to above.

Although this invention has been shown and described with respect to detailed, exemplary embodiment(s) thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

1. A method of actively providing vibration alleviation by reducing vibratory air-loading in the rotor blades of the rotor in an X-Wing aircraft, which includes a series of pneumatic valve control actuators, comprising the following steps:
(a) providing higher harmonic control (HHC) to the rotor and implementing it in two forms, a scheduled HHC system and a closed loop active HHC; and
(b) continuously processing vibration and HHC data from sensors monitoring vibrations at selected locations and in selected axes of the aircraft and updating the HHC based on the data a multiple number of times in each rotor revolution and generating corrective factors which are used in the HHC to further alleviate the vibration.

2. The method of claim 1, wherein there is included the further step(s) of:
utilizing a control equation and implementing the scheduled HHC by utilizing look-up maps for the second through fifth harmonic coefficients of the control equation as a function of airspeed, lift and rotor speed.

3. The method of claim 2, wherein there is included the further step(s) of:
adding the values from the look-up maps to the collective and cyclic terms of the control equation and implementing them through the pneumatic control valve (PCV) actuators.

4. The method of claim 1, wherein there is included the further step(s) of:
   providing a cross channel data link between the scheduled HHC system and the closed loop active HHC.

5. The method of claim 1, wherein there is further included the following step(s):
   providing a multiple number of flight control computers for managing a number of functions of the aircraft, achieving at least quadruple redundancy, and locating the flight control computers within a hardware unit; and
   implementing HHC in a separate dual processor computer section, complete with its own input/output signal processing, but still integrated to be physically located within the same hardware unit of each flight control computer.

6. A system for actively reducing vibratory air-loading in the rotor blades of a rotor in an X-Wing aircraft, which includes a series of pneumatic valve control actuators, comprising:
   higher harmonic control (HHC) means associated with the rotor for alleviating vibration implemented in two forms, a scheduled HHC system and a closed loop active HHC;
   a series of sensors sensing the vibrations of the rotor blades and providing signals based thereon;
   signal processing means associated with said HHC means continuously processing vibration and HHC data from said sensors for generating signals updating the HHC based on the data a multiple number of times in each rotor revolution;
   map means associated with said scheduled HHC providing look-up maps for the second through fifth harmonic coefficients of a control equation as a function of airspeed, lift and rotor speed;
   signal processing means associated with said map means for adding the values from the look-up maps to collective and cyclic terms of the control equation and implementing them through the pneumatic control valve (PCV) actuators; and
   a multiple number of flight control computers managing a number of functions of the aircraft, achieving at least quadruple redundancy; said HHC means being located in a separate dual processor computer section associated with each of said flight control computers and being complete with its own input/output signal processing.

* * * * *

UNITED STATES PATENT AND TRADEMARK OFFICE
CERTIFICATE OF CORRECTION

PATENT NO. : 4,953,098

DATED : August 28, 1990

INVENTOR(S) : William C. Fischer, Jr., Kenneth C. Arifian

It is certified that error appears in the above-identified patent and that said Letters Patent is hereby corrected as shown below:

Column 3, after line 11, please insert --4,514,143  Campbell  04/30/88 "Aircraft Rotor Blade With Passive Tuned Tab"

Column 7, line 7, "$X_D$" should be --"$\hat{X}_D$"--.

Column 7, line 27, "$X_D$" should be --"$\hat{X}_D$"--.

Signed and Sealed this

Twenty-fourth Day of December, 1991

Attest:

HARRY F. MANBECK, JR.

*Attesting Officer*        *Commissioner of Patents and Trademarks*